United States Patent Office 3,676,063
Patented July 11, 1972

3,676,063
PROCESS FOR PREPARING SYNTHETIC CRYSTALLINE ZEOLITIC SODIUM ALUMINOSILICATE
Arpad Elo, Jr., Chicago, and Frank R. Broersma, Oak Forest, Ill., assignors to Nalco Chemical Company, Chicago, Ill.
No Drawing. Filed Mar. 11, 1971, Ser. No. 123,389
Int. Cl. C01b 33/28
U.S. Cl. 23—113          4 Claims

ABSTRACT OF THE DISCLOSURE

Crystalline zeolitic sodium aluminosilicates are prepared by reacting sources of silica, alumina, and sodium oxide in an aqueous medium in the presence of gluconate in an amount sufficient to suppress side reactions and enhance the formation of synthetic faujasite.

BACKGROUND

Crystalline zeolitic sodium aluminosilicates are well known in the art and have been widely used as adsorbents, ion exchangers, catalysts and molecular sieves. Some crystalline hydrated metal aluminosilicates occur naturally and many others have been prepared synthetically. An example of a naturally occurring crystalline hydrated metal aluminosilicate is faujasite which occurs in nature as white octahedral crystals. An example of a synthetic crystalline sodium aluminosilicate is the molecular sieve type zeolite known as "zeolite Y" which is described in U.S. 3,130,007.

The various types of synthetic crystalline zeolitic sodium aluminosilicates contain silica ($SiO_2$), alumina ($Al_2O_3$) and sodium oxide ($Na_2O$) in various proportions and are distinguishable from each other mainly in the relative proportions and in their X-ray diffraction patterns (XRD). However, zeolite Y and faujasite are practically indistinguishable by the usual methods. Zeolite Y can therefore be described as a synthetic faujasite. In this description compounds of this type when made synthetically will be called "zeolite Y."

Another type of synthetic crystalline form of sodium aluminosilicate is known as crystalline zeolite B and is described in U.S. 3,008,803. This type of crystalline zeolitic sodium aluminosilicate can be distinguished from zeolite Y by the usual methods.

These synthetic zeolites are usually prepared by reacting a source of silica, a source of alumina and a source of sodium such as caustic soda, under alkaline conditions at temperatures and for a period of time sufficient to bring about crystal formation. The time required will depend upon the temperature, a longer period being required for lower temperatures and a shorter time being required for higher temperatures. The reactions are normally carried out in an aqueous solution and if temperatures above the boiling point of the solution are used, superatmospheric pressures should be employed.

Inasmuch as some crystalline zeolitic sodium aluminosilicates are more useful for one purpose than another, it would be desirable to control the reaction process in order to selectively produce a particular type of crystalline zeolitic sodium aluminosilicate and suppress side reactions which normally cause the formation of other types of crystalline zeolitic sodium aluminosilicates. A selective process would also result in higher yields of the desired product and prevent the formation of mixtures of products containing large amounts of an undesired product.

OBJECTS

One of the objects of the present invention is to provide a new and improved process for preparing crystalline zeolitic sodium aluminosilicates which is selective.

Another object of the invention is to provide a new and improved process of the type described in which side reactions are suppressed.

Still a further object of the invention is the provision of a new and improved process for producing crystalline zeolitic sodium aluminosilicates of the faujasite or zeolite Y type. Other objects will appear hereinafter.

BRIEF SUMMARY OF THE INVENTION

In accordance with the invention crystalline zeolitic sodium aluminosilicates are prepared from compounds containing silica and alumina by carrying out the process under alkaline conditions in the usual manner but in the presence of a gluconate or gluconates in amounts sufficient to suppress side reactions.

DETAILED DESCRIPTION OF THE INVENTION

The starting materials employed in the practice of the invention and the general conditions used can be the same as those described in U.S. 3,130,007. Thus, activated alumina, gamma alumina, alumina trihydrate, and sodium aluminate can be employed as a source of alumina. Sodium silicate, silica gels, silicic acid, aqueous colloidal silica sols and reactive amorphous solid silicas can be employed as a source of silica. The source of sodium oxide is normally caustic soda.

The preferred reactants are sodium silicate, a concentrated caustic soda solution (50% aqueous NaOH) and sodium aluminate.

For the purpose of the invention a gluconate is added to the reaction mixture. The gluconate can be added in the form of gluconic acid which is available commercially as a 50% by weight aqueous solution and which will react with the caustic soda to form sodium gluconate in the reaction mixture or it can be added as sodium gluconate or as a mixture of gluconates, e.g., sodium gluconate and ammonium gluconate, gluconic acid and sodium gluconate, gluconic acid and ammonium gluconate, and gluconic acid, sodium gluconate and ammonium gluconate.

The quantity of gluconate used should be sufficient to suppress side reactions and amounts within the range of about 2% to 35%, preferably about 5% to 15%, expressed as gluconic acid, of the total weight of $SiO_2$, $Al_2O_3$ and $Na_2O$ is usually sufficient. As will be seen from the following examples by suppressing side reactions the yield of zeolite Y is enhanced.

The crystallization is effected by holding the reaction mixture in the desired temperature range, usually within the range of 20° C. to 125° C., and preferably within the range of 80° C. to 125° C. until the crystalline product is obtained.

In the following examples in which the quantities are given in parts by weight unless otherwise indicated, the raw materials used have the following compositions:

Sodium silicate: 28.6% $SiO_2$, 9% $Na_2O$, balance water
Sodium aluminate: 24.6% $Al_2O_3$, 19.2% $Na_2O$, balance water
Sodium Y zeolite: moist filter cake, 43% solids (unless otherwise noted)
Gluconic acid: 50% aqueous solution Reference to these materials by name signifies the above compositions.

Example I 112.5 gm. sodium silicate, 34.0 gm. of 50% aqueous NaOH solution, 10.8 gm. sodium aluminate, 37.5 gm. gluconic acid, 240 gm. water, and 2.5 gm. zeolite Y (the last added as a seed) were combined at room temperature with vigorous stirring. The mixture was heated to 95° C., and held at this temperature under reflux and without further stirring for 8 hours. The solid product was recovered by filtration, washed with water, and oven dried at 105° C. The dried product was examined by X-ray diffraction, and was found to contain 54% zeolite Y and 43% zeolite B.

Example II

The formulation and operations were the same as in Example I, except that the gluconic acid was omitted. The X-ray examination of the solid product showed 24% zeolite Y and 66% zeolite B.

Example III 20 gallons of water, 6.75 gallons of sodium silicate, and 1.88 gallons of 50% NaOH were combined with stirring and heated to 190° F. 2.3 lbs. of a filter cake containing 65% (ignited at 1200° F. basis) zeolite Y were added as seed. Then, 2224 ml. of sodium aluminate were added, the stirrer was turned off, and the temperature was raised to 205° F. After 4 hours at this temperature, a sample of the solid product was removed, washed with water, and oven dried at 106° C. The XRD showed 45% zeolite Y and 39% zeolite B.

Example IV 40 gallons of water, 13.5 gallons sodium silicate, and 3.76 gallons 50% NaOH were combined and heated to 215° F. 2563 ml. of a slurry containing 2.73 pounds zeolite Y per gallon were added as seed. The temperature was held at 215° F. without further stirring. A solution comprising 4448 ml. of sodium aluminate and 8896 ml. of gluconic acid was added gradually over a period of 2 hours. Cooking at 215° F. was continued for another 2 hours, at the end of which time a sample of the solid product was recovered, water washed, and oven dried. The XRD showed 50% sodium zeolite Y and 7% zeolite B.

Example V 40 gallons of water, 3.76 gallons of 50% NaOH, 4448 ml. of gluconic acid, and 4448 ml. of sodium aluminate were mixed together and heated to 192° F. 2563 ml. of a slurry containing 2.25 lbs./gallon of zeolite Y were added as seed. The temperature was raised to 220° F., and 13.5 gallons of sodium silicate was added gradually over a period of 1.6 hours. Cooking was continued for a total of 4 hours from the beginning of the silicate addition. The XRD showed the solid product recovered at this time to contain 68% zeolite Y and 8% zeolite B.

Example VI

Example V was repeated, except (1) gluconic acid was omitted, and (2) the addition time for sodium silicate was 1.4 hours. The XRD showed the solid product at the end of 4 hours to contain 24% zeolite Y and 8% zeolite B.

Example VII

Example III was repeated but the cooking temperature was 208° F. instead of 205° F. The product at the end of 4 hours contained 52% zeolite Y and 30% zeolite B.

Example VIII

Example III was repeated but the cooking temperature was 215° F. instead of 205° F. The product at the end of 4 hours contained 27% zeolite Y and 60% zeolite B.

It will be noted that Examples I, IV and V relate to a process in which a gluconate was present, whereas Examples II, III, VI, VII and VIII relate to a process in which no gluconate was present. Comparing these examples it will be seen that where gluconic acid was used the formation of zeolite B was relatively low and the yield of zeolite Y was enhanced.

The products obtained in the practice of the process are useful as adsorbents, ion exchangers, catalysts, catalyst supports and molecular sieves.

The invention is hereby claimed as follows:

1. In a process of preparing crystalline zeolitic sodium aluminosilicates wherein a source of silica and a source of alumina are reacted in an aqueous sodium hydroxide solution at temperatures and for a period of time to bring about crystal formation including zeolite Y, the step which comprises carrying out said reaction in the presence of a gluconate in sufficient amounts to suppress side reactions and to enhance the formation of zeolite Y.

2. A process as claimed in claim 1 in which the gluconate is formed by adding gluconic acid to the reaction mixture.

3. A process as claimed in claim 1 in which the amount of gluconate, expressed as gluconic acid, is 2% to 35% by weight of the total weight of $SiO_2$, $Al_2O_3$ and $Na_2O$.

4. A process as claimed in claim 1 in which the amount of gluconate, expressed as gluconic acid, is 5% to 15% by weight of the total weight of $SiO_2$, $Al_2O_3$ and $Na_2O$.

References Cited

UNITED STATES PATENTS

| | | | |
|---|---|---|---|
| 3,008,803 | 11/1961 | Milton | 23—113 |
| 3,130,007 | 4/1964 | Breck | 23—113 |
| 3,313,594 | 4/1967 | Wilson | 23—113 |
| 3,321,272 | 5/1967 | Kerr | 23—113 |
| 3,492,090 | 1/1970 | Jenkins | 23—113 |

EDWARD J. MEROS, Primary Examiner

U.S. Cl. X.R.

23—112; 252—455 Z

PO-1050
(5/69)

UNITED STATES PATENT OFFICE
CERTIFICATE OF CORRECTION

Patent No. 3,676,063   Dated July 11, 1972

Inventor(s) Arpad Elo, Jr. and Frank R. Broersma

It is certified that error appears in the above-identified patent and that said Letters Patent are hereby corrected as shown below:

Column 3, line 31, "106° C." should read -- 105° C. --.

Signed and sealed this 14th day of November 1972.

(SEAL)
Attest:

EDWARD M. FLETCHER, JR.          ROBERT GOTTSCHALK
Attesting Officer                Commissioner of Patents